Patented June 2, 1953

2,640,819

UNITED STATES PATENT OFFICE 2,640,819

PROCESS FOR POLYMERIZING STYRENE AND MALEIC COMPOUNDS

Gerald R. Barrett, Winchester, Mass., assignor to Monsanto Chemical Company, St. Louis, Mo., a corporation of Delaware No Drawing. Application April 29, 1950, Serial No. 159,137

10 Claims. (Cl. 260—78.5)

The present invention relates to improved processes for the mass polymerization of styrene with maleic anhydride or esters of maleic acid or mixtures thereof.

It has been proposed theretofore to mass polymerize a mixture of styrene and maleic anhydride by cautiously heating the mixture on a water bath and then moderating the reaction by cooling or by raising the temperature of the mixture very slowly. This method is not suitable in commercial operations since relatively large masses of these reactants generate considerable heat and it is extremely difficult to maintain the reaction rate sufficiently low to keep the reaction under control. Moreover, the polymer formed tends to separate from the monomeric constituents as a gel and this is highly undesirable for a number of reasons, one of which is that it renders control of the reaction more difficult in that the heat in the mass cannot be removed satisfactorily. Another reason is that the separated polymer tends to be swollen with an excess of maleic anhydride which persists in the final polymer as a monomeric material. Further, this prior method provides a non-uniform copolymer, a part of which may not be soluble in aqueous alkali solution and the copolymer generally has a molecular weight, as measured in an alkaline water solution, which is too high for most uses, for example, as a sizing agent for textile yarns.

In accordance with the processes of the present invention, it is possible to control the polymerization rate so that the reaction of the different monomeric constituents of the mass with each other or with the partially formed polymer is controlled without the danger of runaway reaction rates, and it is also possible to provide a product which possesses a lower average molecular weight than would otherwise be obtained by the prior art method described above.

It is one object of this invention to provide processes for controlling the reaction rate in the mass polymerization of styrene with maleic anhydride or alkyl half esters of maleic acid or mixtures of such anhydride and esters.

A further object of this invention is to provide processes for controlling the reaction rate in the mass polymerization of styrene with maleic anhydride or alkyl half esters of maleic acid or mixtures of such anhydrides and esters and at the same time produce a heteropolymer which is substantially uniform in composition and characterized by low average molecular weight.

Still further objects and advantages of this invention will appear from the following description and the appended claims.

The processes of the present invention are carried out, in general, by subjecting a mixture of styrene and maleic anhydride or a mixture of styrene and alkyl half esters of maleic acid or a mixture of styrene, maleic anhydride and alkyl half esters of maleic acid to free radical inducing conditions in the presence of a small amount of 2,5 ditertiary butyl parabenzoquinone, hereinafter referred to as ditertiary butyl quinone, until the resulting mass is substantially free of monomeric constituents namely, unreacted styrene, maleic anhydride or alkyl half esters of maleic acid.

The term "mixture" as used herein is intended to include the monomeric constituents, namely styrene and maleic anhydride, or styrene and alkyl half esters of maleic acid or styrene, maleic anhydride and alkyl half esters of maleic acid to the exclusion of solvents or diluents for the monomers other than the organic solvents or diluents which may be present in small amounts as the result of the preparation of the alkyl half esters of maleic acid. Thus, in the preparation of alkyl half esters of maleic acid wherein a monohydric alcohol is reacted with maleic acid or maleic anhydride, small amounts, for example, from 0.01 to 0.05 mol of unreacted alcohol per mol of the resulting ester may remain in the final product. The unreacted alcohol is not usually separated from the ester and is employed together with the ester in the mass polymerization process, without the addition of diluents. The mixture may, however, contain small amounts of polymerization catalysts such as a peroxide, for example, ditertiary butyl peroxide, agents which are used to preserve the commercial monomers such as tertiary butyl catechol and other monomeric polymerizable materials, for example, up to 5% by weight of maleic acid.

The term "free radical inducing conditions" as used herein is intended to cover the various known means by which free radicals capable of initiating polymerization are produced. Such known means include heat, actinic radiation and free radical promoting catalysts such as the peroxides, for example, benzoyl peroxide and the azo compounds, for example, $a,a'$ azo bis isobutyrl nitrile. Any one of these means may be used alone or in combination with each other to produce free radicals capable of initiating polymerization of the monomeric constituents.

A preferred manner of producing free radicals either to initiate the polymerization or during the major portion of the polymerization is by the use of heat. In such cases heat is supplied to the mixture to form free radicals and thus initiate polymerization, and heat is used to continue the generation of free radicals and thus enable the polymerization to go to substantial completion. Once the polymerization is initiated the reaction is exothermic, that is, heat is generated and the polymerization is thus self sustaining at least throughout a portion of the reaction. During the period of vigorous heat generation, which is generally during the major portion of the polymerization or reaction, heat may have to be removed from the mass to keep the reaction under control, and this is suitably accomplished by cooling the mass. In some instances depending to some extent upon the particular combination of monomers used, the amount of the quinone employed and the volume occupied by the mixture it is desirable to supply heat to the mass throughout the reaction, or at least allow the reaction to proceed by the heat generated in the mass until a major portion of the reaction is complete after which additional heat is supplied to complete the reaction.

The temperature at which the polymerization is carried out when heat is used to provide free radical inducing conditions may be varied to a considerable extent and depends upon a variety of factors. These factors include the particular monomers used, the amount of ditertiary butyl quinone employed and the volume and thickness of the mass to be polymerized. In general, the temperature required to initiate the polymerization of mixtures of styrene and maleic anhydride is less than that required with mixtures of styrene and alkyl half esters of maleic acid. During the major portion of the polymerization lower temperatures are generally required for the styrene-maleic anhydride system than for the styrene-alkyl half ester of maleic acid system. Lower temperatures are generally desirable when a large, thick mass is polymerized while higher temperatures may be used when the mass is smaller and relatively thin. Higher temperatures can be used when increasing amounts of ditertiary butyl quinone are employed. This is of considerable advantage particularly when products of very low molecular weight are desired since higher temperatures favor the formation of such products.

The temperature at which the polymerization is carried out also varies depending upon the particular phase of the polymerization or reaction. Thus, the polymerization is suitably initiated in most instances by raising the temperature of the mixture to 30 to 80° C. During the major period of vigorous heat generation, which follows, satisfactory results are obtained by maintaining the temperature of the mixture between about 30 and 80° C. either by supplying heat or cooling the mass as required. After the vigorous generation of heat has subsided the temperature of the mixture, which is now substantially polymerized, is raised to about 110 to 180° C. to complete the reaction.

The duration of the polymerization varies considerably depending upon the free radical inducing conditions used, the particular combination of monomers employed, the temperature used, the presence or absence of polymerization retarting impurities such as air or the like, the volume and thickness of the mixture and other factors which are too indefinite to be properly evaluable. In general, the total time required varies between about 6 and 36 hours, for example, with a styrene-maleic anhydride system and about 8 to 48 hours, for example, with a styrene- alkyl half ester of maleic acid system. The total duration of time required for the polymerization is largely influenced by the increments of time necessary to carry out the component phases of the polymerization. Thus, from 15 minutes to 120 minutes is generally required to initiate the reaction. After the polymerization is initiated the period during which vigorous heat generation occurs will vary between about 2 hours and 44 hours depending upon the various factors referred to above. After the vigorous generation of heat has subsided about 1 to 6 hours are required to complete the polymerization.

From the foregoing considerations, it is apparent that when heat is used for the purpose of providing free radical conditions and thus effecting the polymerization, the polymerization is, in general, carried out at temperatures between 30 and 180° C. and for a period of 6 to 48 hours.

The ditertiary butyl quinone (2,5 ditertiary butyl parabenzoquinone) is preferably added to the mixture of monomers before polymerization is initiated, but may be added after the polymerization is initiated and at some stage of the polymerization before about 20% or less of the monomers have reacted. The term "in the presence of" as used herein is intended to cover such conditions. The quantity of ditertiary butyl quinone added may be varied to a considerable extent. For example, it is possible to use as little as 0.01% by weight and as much as 2% by weight on the weight of monomeric constituents. As little as 0.01% by weight of the quinone appreciably retards the reaction rate of styrene and maleic anhydride and at the same time provides a product of low average molecular weight while 2% of the quinone has a more pronounced effect in both respects. However, the use of comparatively large amounts of the quinone should be avoided as the reaction rate is reduced to such an extent that the polymerization becomes impractical on a commercial scale. Best results have been obtained by using from 0.05 to 0.5% by weight of the quinone on the weight of the monomeric constituents.

In carrying out the processes of this invention the mol ratio of styrene to the maleic components in the mixture is critical. A mol ratio of styrene to maleic components between 1 : 1 and 1.5 : 1 may be used successfully. Best results are obtained by using from 1 to 1.2 mols of styrene for each mol of maleic anhydride, and from 1.4 to 1.5 mols of styrene per mol of alkyl half ester of maleic acid. The term "maleic components" is used to designate maleic anhydride, alkyl half esters of maleic acid or mixtures of the anhydride and such esters. The alkyl half esters of maleic acid include secondary alkyl half esters and normal alkyl half esters of maleic acid, preferably those alkyl half esters having from 1 to 12 carbon atoms on the alkyl group.

As examples of alkyl half esters of maleic acid which are useful in the processes of this invention may be mentioned methyl acid maleate, ethyl acid maleate, isopropyl acid maleate, isobutyl acid maleate, methyl isobutyl carbinyl acid maleate, lauryl acid maleate and the like.

The polymerization is carried out either in the presence or absence of a polymerization catalyst. The use of a polymerization catalyst is sometimes detrimental especially if the reaction rate is thereby unduly increased. However, such catalyst is helpful in carrying the reaction to completion in a shorter period of time. A large variety of polymerization catalysts are useable in the processes of this invention including, generally, the dialkyl disulfides such as diamyl disulfide, ditertiary dodecyl disulfide and the like; azo compounds such as a,a' azo bis isobutyrl nitrile and the like; perbenzoates such as ditertiary butyl perbenzoate; dialkyl peroxides such as ditertiary butyl peroxide, ditertiary amyl peroxide, diethyl peroxide and the like; and some aromatic peroxides such as benzoyl peroxide. When such catalysts are used, it is preferred to employ small amounts, for example, from 0.005 to 1% on the weight of the monomeric constituents.

The polymerization is carried out either in the presence of air or in an atmosphere of inert gas such as carbon dioxide, nitrogen, helium, argon, etc. It is preferred, however, to carry out the reaction in an atmosphere of such inert gas and to replace or sweep out a major portion of any air entrapped in such monomers with such inert gas prior to initiating the polymerization.

A further understanding of the present invention will be obtained from the following specific examples which are intended to be illustrative, but not limitative, of the processes of this invention, parts and percentages being by weight.

Example I

Seventy grams of a monomer mixture consisting of 51.43% styrene, 38% maleic anhydride, 10.5% monomethyl maleate and 0.07% ditertiary butyl quinone were charged to a 25 millimeter diameter tube, after which the tube was flushed free of air with carbon dioxide and then stoppered. The tube, which was provided with a thermocouple to measure the temperature of the ingredients therein, was heated in an oven with forced air circulation at a temperature of 55° C. After the polymerization was initiated, which required about 30 minutes, the temperature of the ingredients in the tube rose above the temperature of the circulating air in the oven due to the exothermic reaction and the generation of heat. The temperature of the ingredients in the tube was maintained at about 60° C. during the major portion of heat generation. When the temperature difference between the polymer in the tube and the air in the oven began to decrease, the oven temperature was gradually raised and finally held at 140° C. for two hours to complete the reaction. The entire process required about 25 hours. On cooling, a hard, water-white, transparent solid was obtained.

One gram of the above product was dissolved in sufficient cyclohexanone to provide a solution of 1% concentration. This solution had a viscosity of 4.3 centipoises at 25° C.

A similar material was prepared without the use of ditertiary butyl quinone. A 1% solution of such material in cyclohexanone had a viscosity of 9 centipoises at 25° C. Since the viscosity of a solution of a polymeric material is proportional to the average molecular weight of such material, it is evident that the process involving the use of ditertiary butyl quinone has effected a marked reduction in the molecular weight of the polymeric material as compared to the polymeric material produced without the use of such quinone.

The polymeric materials prepared as described above are soluble in water solutions of alkali, for example, aqueous ammonia or aqueous caustic soda solutions. In concentrated solutions of the polymeric materials in aqueous alkali or ammonia, the viscosity differences between solutions prepared from the polymers made with and without the use of tertiary butyl quinone are magnified many fold, the exact ratio being dependent on the concentration of the polymeric material. For many solution applications the viscosity lowering and consequent increased solids content of solutions for any given viscosity which characterizes the product made with ditertiary butyl quinone is an important advantage.

Example II

Seventy grams of a monomer mixture consisting of 51.3% styrene, 38% maleic anhydride, 10.4% monomethyl maleate, 0.25% ditertiary butyl quinone and 0.05% ditertiary butyl peroxide were charged to 25 millimeter diameter tube, after which the tube was flushed free of air with nitrogen and then stoppered. The tube, which was provided with a thermocouple to measure the temperature of the ingredients therein, was heated in an oven with forced air circulation at a temperature of 70° C. After the polymerization was initiated, which required about 20 minutes, the temperature of the ingredients in the tube rose above the temperature of the circulating air in the oven due to the exothermic reaction and the generation of heat. The temperature of the ingredients in the tube was maintained at about 75° C. during the major portion of heat generation. When the temperature difference between the polymer in the tube and the air in the oven began to decrease, the oven temperature was gradually raised and finally held at 140° C. for two hours to complete the reaction. The entire process required about 20 hours. On cooling, a hard, water-white, transparent solid was obtained.

A 1% solution of the above product in cyclohexanone had a viscosity of 2.8 centipoises at 25° C.

In this example the peroxide was added to assist completion of the reaction at the higher temperature without having any important effect on the main part of the reaction at the lower temperatures.

Example III

Seventy grams of a mixture consisting of 51.5% styrene, 47.5% maleic anhydride and 1% ditertiary butyl quinone were charged to a 25 millimeter diameter tube, after which the tube was flushed free of air with nitrogen and then stoppered. The tube, which was provided with a thermocouple to measure the temperature of the ingredients therein, was heated in an oven provided with forced air circulation. The temperature of the air in the oven which was initially about 85° C., was maintained at a temperature such that the temperature of the ingredients in the tube was about 90° C. during the major portion of the period of heat generation within the tube. The reaction was substantially complete after about 6 hours. The temperature of the ingredients in the tube was then raised to 125° C. for several hours by raising the temperature of the oven to complete the reaction. After cooling the tube to room temperature a hard, water-white, transparent solid was obtained, which solid was soluble in dilute aqueous solutions of caustic soda or ammonia.

Two grams of the above solid were dissolved in 100 cc. of acetone. The resulting solution was compared with a similar solution prepared from a styrene-maleic anhydride polymer made without the use of the ditertiary butyl quinone and it was noted that the latter solution was 5 times more viscous than the former on an equal solids basis.

*Example IV*

Seventy grams of a mixture consisting of 48% styrene, 39% secondary butyl acid maleate, 11% methyl acid maleate, 1.54% maleic anhydride, 0.35% benzoyl peroxide, 0.05% of ditertiary butyl peroxide and 0.06% of ditertiary butyl quinone were charged to a 25 millimeter diameter tube which was provided with a thermocouple for measuring the temperature of the ingredients therein. The tube and its contents were flushed free of air with nitrogen, stoppered and then heated in an oven with forced air circulation at a temperature of 60° C. After the polymerization was initiated, which required about 45 minutes, the temperature of the ingredients in the tube rose above the temperature of the circulating air in the oven due to the exothermic reaction and the generation of heat. The temperature of the ingredients in the tube was maintained at about 60° C. during the major portion of heat generation. When the temperature difference between the polymer in the tube and the air in the oven began to decrease, the oven temperature was gradually raised and finally held at 160° C. for two hours to complete the reaction. The entire process required about 30 hours. On cooling of the tube, a hard, water-white, transparent solid was obtained.

A 1% solution of the above product in cyclohexanone had a viscosity of 3.8 centipoises at 25° C.

A similar product was prepared without the use of ditertiary butyl quinone and a 1% solution of the product in cyclohexanone had a viscosity of 4.6 centipoises at 25° C.

The products produced in accordance with the processes of this invention have a wide variety of uses. In general, they are suitably employed by dissolving them in organic liquids such as the ketones, for example, acetone and then applying the resulting solutions to fabrics, metals, wood or the like for the purpose of providing protective coatings. The copolymers prepared from styrene and maleic anhydride, or styrene with mixtures of maleic anhydride and alkyl half esters of maleic acid, or styrene and alkyl half esters of maleic acid, which contain from 1 to 4 carbon atoms in the alkyl group, are generally soluble in dilute aqueous solutions of alkali metal carbonates or hydroxides, or ammonia. The resulting solutions are quite useful as sizing agents for sizing warp yarns.

Various changes and modifications may be made in the processes of this invention as will be apparent to those skilled in the art to which it appertains without departing from the spirit and intent of the present invention. Accordingly, it is intended that the present invention shall only be limited by the scope of the appended claims.

What is claimed is:

1. A process of mass polymerizing styrene and maleic compounds which comprises subjecting a mixture of styrene and a maleic compound selected from the group consisting of maleic anhydride, alkyl half esters of maleic acid and mixtures of said anhydride and said esters to free radical inducing conditions in the presence of from about 0.01 to 2% by weight, based on the monomers in the mixture, of 2,5 ditertiary butyl parabenzoquinone until the resulting mass is substantially free of unreacted styrene and maleic compound, said styrene and maleic compound being present in said mixture in a mol ratio between 1:1 and 1.5:1.

2. A process of mass polymerizing styrene and maleic anhydride which comprises heating a mixture of styrene and maleic anhydride in the presence of from 0.01 to 2% by weight, based on the monomers in the mixture, of 2,5 ditertiary butyl parabenzoquinone and maintaining the temperature of the mixture between 30 and 180° C. until the resulting mass is substantially free of unreacted styrene and maleic anhydride, said styrene and maleic anhydride being present in the mixture in a mol ratio between 1:1 and 1.2:1.

3. A process of mass polymerizing styrene and alkyl half esters of maleic acid which comprises heating a mixture of styrene and alkyl half esters of maleic acid, in which the alkyl group contains from 1 to 12 carbon atoms, in the presence of from 0.01 to 2% by weight, based on the monomers in the mixture, of 2,5 ditertiary butyl parabenzoquinone and maintaining the temperature of the mixture between 30 and 180° C. until the resulting mass is substantially free of unreacted styrene and alkyl half ester of maleic acid, said styrene and alkyl half ester being present in the mixture in a mol ratio between 1:1 and 1.5:1.

4. A process according to claim 3, but further characterized in that the alkyl half ester of maleic acid is secondary butyl acid maleate.

5. A process according to claim 3, but further characterized in that the alkyl half ester of maleic acid is methyl isobutyl carbinyl acid maleate.

6. A process of mass polymerizing styrene and maleic compounds which comprises heating a mixture of styrene, maleic anhydride and an alkyl half ester of maleic acid, in which the alkyl group contains from 1 to 12 carbon atoms, in the presence of from about 0.01 to 2% by weight, based on the monomers in the mixture, of 2,5 ditertiary butyl parabenzoquinone and maintaining the temperature of the mixture between 30 and 180° C. until the resulting mass is substantially free of unreacted styrene and maleic compounds, said styrene and maleic components being present in the mixture in a mol ratio between 1:1 and 1.5:1.

7. A process of mass polymerizing styrene and maleic compounds which comprises heating a mixture of styrene, maleic anhydride and an alkyl half ester of maleic acid, in which the alkyl group contains from 1 to 12 carbon atoms, and from 0.01 to 2% by weight, based on monomers in the mixture, of 2,5 ditertiary butyl parabenzoquinone and maintaining the temperature of the resulting mass between 30 and 180° C. for a period of 6 to 48 hours, said styrene and maleic components being present in the mixture in a mol ratio between 1:1 and 1.5:1.

8. A process according to claim 7, but further characterized in that the alkyl half ester of maleic acid is methyl acid maleate.

9. A process according to claim 7, but further characterized in that the mixture is heated in the presence of a polymerization catalyst and in an atmosphere of inert gas.

10. A process of mass polymerizing styrene and maleic compounds which comprises heating a mixture of styrene and a maleic compound selected from the group consisting of maleic anhydride, alkyl half esters of maleic acid and mixtures of said anhydride and said esters in the presence of from about 0.01 to 2% by weight, based on the monomers in the mixture, of 2,5 ditertiary butyl parabenzoquinone and maintaining the temperature of the mixture between 30 and 180° C. for a period of 6 to 48 hours, said quinone being added to the mixture at some stage of the polymerization before more than 20% of the monomers have reacted, said styrene and maleic compound being present in said mixture in a mol ratio between 1:1 and 1.5:1.

GERALD R. BARRETT.

References Cited in the file of this patent

UNITED STATES PATENTS

| Number | Name | Date |
|---|---|---|
| 2,047,398 | Voss et al. | July 14, 1936 |

OTHER REFERENCES

Chemical Engineering News, page 2889 (advertisement), Nov. 10, 1946.

Goldfinger et al.: J. Physical Chem. 47, 578–587 (Nov. 1943).